Feb. 9, 1937.  H. D. HUME ET AL  2,070,083

HARVESTER

Filed Nov. 2, 1935

HORACE D. HUME
JAMES E. LOVE
*Inventor*

By Herbert E. Smith

*Attorney*

Patented Feb. 9, 1937

2,070,083

UNITED STATES PATENT OFFICE 2,070,083

HARVESTER

Horace D. Hume and James E. Love, Garfield, Wash., assignors to Hume-Love Company, Garfield, Wash., a corporation Application November 2, 1935, Serial No. 48,024

4 Claims. (Cl. 56—224)

Our present invention relates to improvements in harvesters of the rotary reel type and employing as a part of the implement a foldable and adjustable reciprocating side cutter which is preferably driven through the operation of the wheel-drive, as is also the rotary reel. In carrying out our invention it may be embodied as an attachment to a mower of the sickle type, or the mower of the sickle type may be manufactured with our improvements as a part of the unitary structure.

The harvesting implement with our improvements is especially adapted for use on small farms, and it is also well adapted for harvesting the crop at the borders of a large field, thus saving a portion of the crop that is usually inaccessible to the combine harvester employed in harvesting large crops. Where the grain has fallen over, or is bent over from erect position, the rotary reel is effective in restoring the grain to standing position and gathering the grain in position for cutting by the mower or sickle. The implement is also well adapted for harvesting vine-crops such as peas and soy beans, and other crops that lie close to the ground.

In the illustrated embodiment of our invention we illustrate reel-bats or tine-bars which have a supplemental movement in addition to the rotation of the reel for maintaining the tines in effective working position, but it will be understood that our invention may be used in combination with other types of rotary reels. Our invention consists in certain novel combinations and arrangements of parts involving the supporting structures for the rotary reel and the operating, or drive mechanism for the reel. In the accompanying drawing we have illustrated one complete example of the physical embodiment of our invention wherein the parts are combined and arranged according to one mode we have thus far devised for the practical application of the principles of our invention; it will however, be understood that changes and alterations may be made in the exemplifying structures within the scope of our claims, without departing from the principles of our invention.

Figure 1:
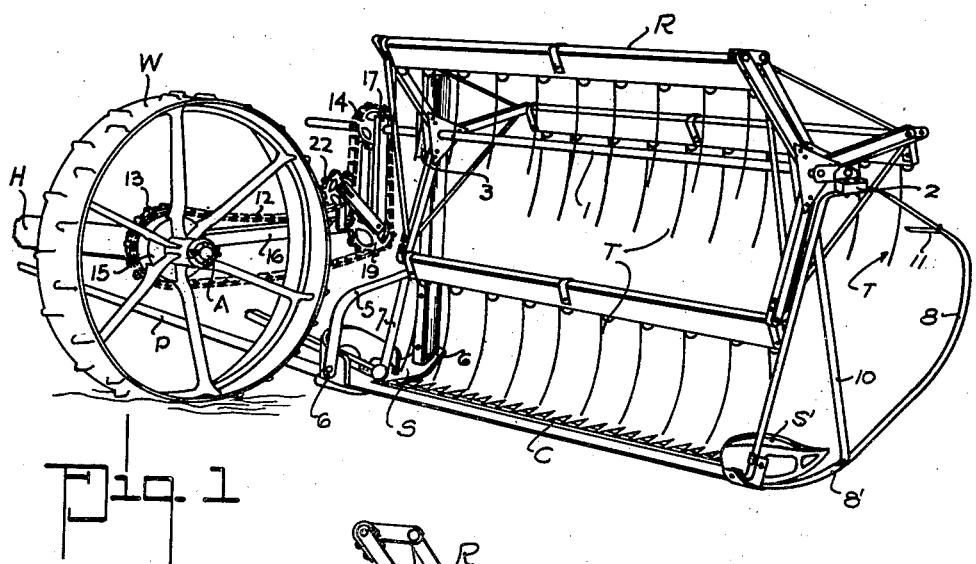
Figure 1 is a perspective view of so much of a mower of the side cutting type as is necessary to illustrate our invention.
Figure 2:
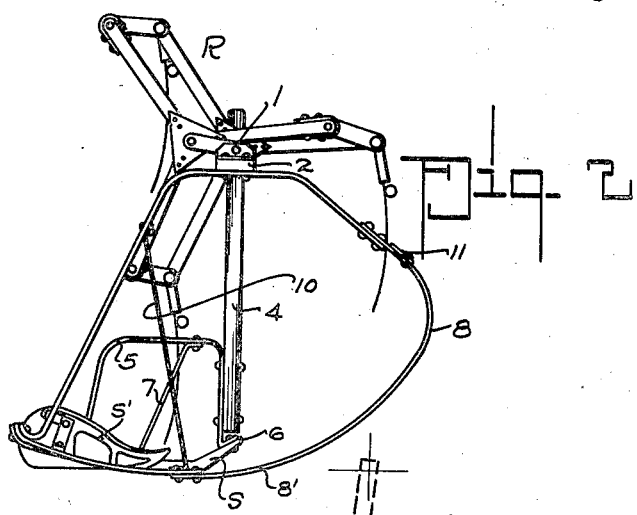
Figure 2 is a view in side elevation showing the cutter and the rotary reel mounted thereon.

The side-cutting reciprocal mower or sickle is operated from the wheel W, which is supporting the axle A and axle housing H in Figure 1, and the reciprocal cutter C is supported on the shoes S and S' and driven through the usual operating rod or pitman P. The rotary reel R with its tines T is supported above and in advance of the cutter C so that the tines may gather and pass the grain or vines to the cutter C. The central reel shaft I is journaled in the outer bearing 2 and the inner bearing 3 provided therefor, and the inner bearing 2 is supported at the upper end of an upright or vertical frame-post 4, which is located at the front end of the shoe S, and bolted rigidly to an arch frame 5 extending transversely of the cutter C and rigidly fastened as by bolts at 6, 6 to the front and rear ends of the shoe S of the cutter C. A brace 7 also joins the arch-frame 5 with the shoe S, and the shoe, the frame, and the post 4 thus provide an effective support for the bearing 3 in which the inner end of the reel shaft I is journaled.

At its outer end, the shaft I through its bearing 2 is supported on a frame 8 in the form of a loop which is fashioned with a runner portion 8' upon which the cutter may rock when the cutter bar or sickle is tilted to adjusted position. This supporting frame 8 with its runner or rocker 8' is rigidly attached or fastened to the outer shoe S' at 9, and the looped frame is braced by a diagonal brace 10, to form a suitable and rigid support for the bearing 2 of the rotary reel.

At the front end of the frame 8, which frame is located beyond the outer end of the rotary reel, we provide a guide bar or finger 11 which is rigid with the frame. The finger extends toward the rotary reel, and is designed to act as a guide for fallen grain in directing the grain to position so that it may be reached by the rotating tines of the reel. The grain is thus guided out of the path of the operating mechanism of the cutter located adjacent the shoe S'.

In this described manner it will be apparent that the rotary reel R is supported in elevated position parallel with and slightly in advance of the cutter C, and this mounting for the reel may be embodied in the manufactured implement, or provided as an attachment for the mower. In this position of the reel the revolving tines, with their supplemental rotation, operate effectively across the cutter C, to lift the crop and to sweep the grain, or vines, as the case may be, back of the cutter after it has been cut.

Inasmuch as the rotary reel R is mounted on the cutter C and partakes of various movements of the cutter when the latter is being adjusted to elevate or depress the cutting teeth, or when the free end of the cutter is being tilted upwardly to avoid a stone, mound, or other obstruction in its path, a flexible and adjustable driving mechanism is provided between the axle A of the implement and the reel shaft 1. This driving mechanism includes an endless drive chain or sprocket chain 12 suspended over the drive sprocket wheel 13 on the axle, and a driven sprocket wheel 14 on the shaft 1, a ratchet or driving clutch 15 being utilized at the driving sprocket for a forward drive, only, of the chain, and to provide for free rotation of the axle A with relation to the clutch when the implement is backed up or reversed in its movement.

The drive chain is supported on and guided by the use of a flexible adjustable frame which includes an arm 16 that is disposed in substantially horizontal position with its rear end attached or fastened rigidly to the axle housing H. At its forward end, which terminates at approximately a line drawn between the reel shaft and the cutter C, the arm has an upright link 17 pivoted to the arm at 18, and an idle guide sprocket 19 is journaled on the pivot pin. The lower, return portion, of the chain passes around the outer periphery of the guide sprocket 19, and back to the drive sprocket. The driving flight of the drive chain passes under and around another, spaced guide sprocket 20 and thence to the driven sprocket 14. This guide sprocket is journaled on a pin 21 in the free end of a slotted arm 22 that is pivoted on the pivot 18 of the drive-frame, and the pin 21 is also freely mounted in a bracket arm 23 rigid with the main frame-arm 16. This arrangement of parts compensates for variations in the relation between the drive shaft A and sprocket 15 and the driven shaft 1 and its sprocket 14, maintaining the drive chain at all times in working condition, in order that the driving mechanism is operative regardless of the position of the reel and the cutter to which it is rigidly mounted.

Figure 3:
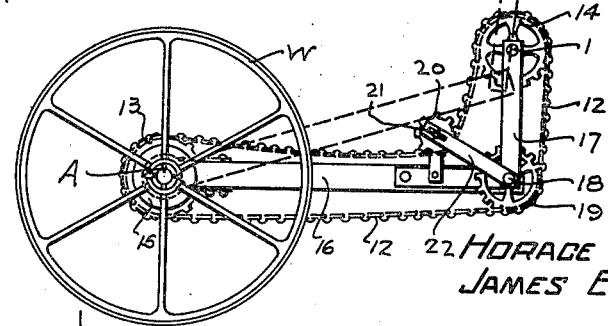
Figure 3 is a view in side elevation showing the wheel-driven reel-operating mechanism, and by dotted lines indicating the flexibility or adjustability of the reel-drive.

In adjusting the cutter C to elevate, or to depress, the cutter teeth, the movement in adjusting the cutter is multiplied in the consequent movement of the reel shaft, and therefore the flexible arrangement of the drive frame and the drive mechanism are necessary to compensate for this greater adjusting movement of the reel. So also, when the cutter C is tilted to swing its outer free end upwardly to avoid an obstruction in the path of the cutter, the drive frame and the drive chain are flexed, as indicated by dotted lines, as in Figure 3.

When the cutter bar or cutter C is tipped to adjust the sickle with relation to the ground surface, the driving mechanism for the reel and the drive-frame, are flexed on the pivot 18, and the adjustable guide sprocket 20 is moved to proper relation on the driving flight of the sprocket chain to maintain the chain in operative position.

Having thus fully described our invention, what we claim as new and desire to secure by Letters Patent is:—

1. The combination in a mower of the sickle type with its adjustable cutter and frame, of a supporting frame mounted on each of the ends of said cutter frame, and one of said supporting frames having a rocker-portion, a rotary reel having a shaft mounted to revolve in each supporting frame, means for operating the cutter, and adjustable driving mechanism connecting an operating part of the mower with said reel shaft.

2. The combination, in a mower of the sickle type with its cutter and spaced shoes therefor, of an arched-frame mounted on one shoe and a bearing post rigid with said frame, a looped frame mounted on the other shoe and having a rocker portion, a rotary reel journaled in said post and looped frame, means for operating the cutter, and means for operating said reel.

3. The combination in a mower with its driving axle and housing, an adjustable cutter and a supporting frame mounted thereon, and a rotary reel having a shaft journaled in the frame, of an adjustable drive-frame comprising a substantially horizontal arm rigid with the housing, an upright link pivotally connecting the free end of the arm and said shaft, a sprocket-chain-drive connecting said axle and shaft, and guide sprocket wheels mounted on the drive-frame for the chain-drive.

4. The combination in a mower with its driving axle and housing, an adjustable cutter and a supporting frame mounted thereon, and a rotary reel having a shaft journaled in the frame, of an arm rigidly attached at one end to the housing, an upright link pivotally connecting the arm with said shaft, a slotted arm pivoted at the pivotal center between the first arm and said link, a bracket arm rigid with the first arm and a pin rigid with the bracket arm engaging the slotted arm, a sprocket-chain-drive connecting the axle and shaft, a guide-sprocket mounted at said pivotal center, and a guide-sprocket mounted on the bracket-pin.

HORACE D. HUME.
J. E. LOVE.